US009555566B2

(12) United States Patent
Gani et al.

(10) Patent No.: US 9,555,566 B2
(45) Date of Patent: Jan. 31, 2017

(54) COMPOSITE MATERIAL PART HAVING THERMAL PROTECTION BASED ON RESIN, AND ITS METHOD OF FABRICATION

(71) Applicant: SNECMA, Paris (FR)

(72) Inventors: Lea Gani, Paris (FR); Benedicte Marie Le Borgne, Paris (FR); Gilbert Michel Marin Leconte, Ozoir la Ferriere (FR)

(73) Assignee: SNECMA, Paris (FR)

(*) Notice: Subject to any disclaimer, the term of this patent is extended or adjusted under 35 U.S.C. 154(b) by 652 days.

(21) Appl. No.: 13/936,691

(22) Filed: Jul. 8, 2013

(65) Prior Publication Data
US 2014/0008838 A1 Jan. 9, 2014

(30) Foreign Application Priority Data

Jul. 9, 2012 (FR) ..................... 12 56583

(51) Int. Cl.
B29C 45/00 (2006.01)
B29C 70/46 (2006.01)
(Continued)

(52) U.S. Cl.
CPC ....... *B29C 45/0003* (2013.01); *B29C 45/1639* (2013.01); *B29C 45/1671* (2013.01);
(Continued)

(58) Field of Classification Search
CPC ........ B29C 70/086; B29C 70/68; B29C 70/70; B29C 45/1639; B29C 45/1671
(Continued)

(56) References Cited

U.S. PATENT DOCUMENTS 5,001,000 A 3/1991 Rohrbacher et al.
2001/0050450 A1* 12/2001 Kayano ............... B29C 45/1639
264/513

(Continued)

FOREIGN PATENT DOCUMENTS

EP 1 593 491 A1 11/2005
WO WO 2010/083024 A2 7/2010

OTHER PUBLICATIONS

Campbell F C Ed—Campbell Flake C, "Manufacturing processes for advanced composites", Elsevier Advanced Technology, Liquid Molding: You Get a Good Perform and Tool . . . You Get a Good Part, XP-002580602, Jan. 1, 2004, 53 pages.

(Continued)

*Primary Examiner* — Alison L Hindenlang
*Assistant Examiner* — Lawrence D Hohenbrink, Jr.
(74) *Attorney, Agent, or Firm* — Oblon, McClelland, Maier & Neustadt, L.L.P.

(57) ABSTRACT

A method of making a structural part having a thermal protection barrier is provided. The method includes: making a fiber structure; introducing the fiber structure into an injection mold having first and second chambers, the fiber structure being placed in the second chamber; placing a movable separator partition between the first and second chambers; injecting a first resin into the first chamber; solidifying the resin injected into the first chamber; withdrawing the movable separator partition; injecting a second resin into the second chamber containing the fiber texture; and hardening the resins present in the first and second chambers of the injection mold in such a manner as to obtain a part having a structural core made of composite material constituted by fiber reinforcement densified by an organic matrix, and a thermal barrier constituted by a layer of hardened resin.

8 Claims, 9 Drawing Sheets

(51) Int. Cl.
  *B29C 70/48* (2006.01)
  *B29C 45/16* (2006.01)
  *B29C 70/08* (2006.01)
  *B29C 70/70* (2006.01)
  *B29C 70/68* (2006.01)
  *B29L 23/00* (2006.01)
  *B29L 31/30* (2006.01)
  *B29K 105/12* (2006.01)

(52) U.S. Cl.
  CPC .......... *B29C 70/086* (2013.01); *B29C 70/462* (2013.01); *B29C 70/48* (2013.01); *B29C 70/68* (2013.01); *B29C 70/70* (2013.01); *B29K 2105/12* (2013.01); *B29K 2995/0015* (2013.01); *B29L 2023/00* (2013.01); *B29L 2031/3082* (2013.01)

(58) Field of Classification Search
  USPC .................................................. 264/260, 263
  See application file for complete search history.

(56) References Cited

U.S. PATENT DOCUMENTS

| | | | |
|---|---|---|---|
| 2002/0004433 A1 | 1/2002 | Fujiwara et al. | |
| 2006/0110599 A1 | 5/2006 | Honma et al. | |
| 2006/0138697 A1* | 6/2006 | Lorenz | B29C 45/0017 264/242 |
| 2011/0175254 A1* | 7/2011 | Kroll | B29C 45/1671 264/232 |
| 2012/0003454 A1 | 1/2012 | Younes et al. | |
| 2012/0094106 A1 | 4/2012 | Honma et al. | |

OTHER PUBLICATIONS

French Preliminary Search Report issued Apr. 2, 2013, in French 1256583, filed Jul. 9, 2012 (with English Translation of Categories of Cited Documents).

* cited by examiner

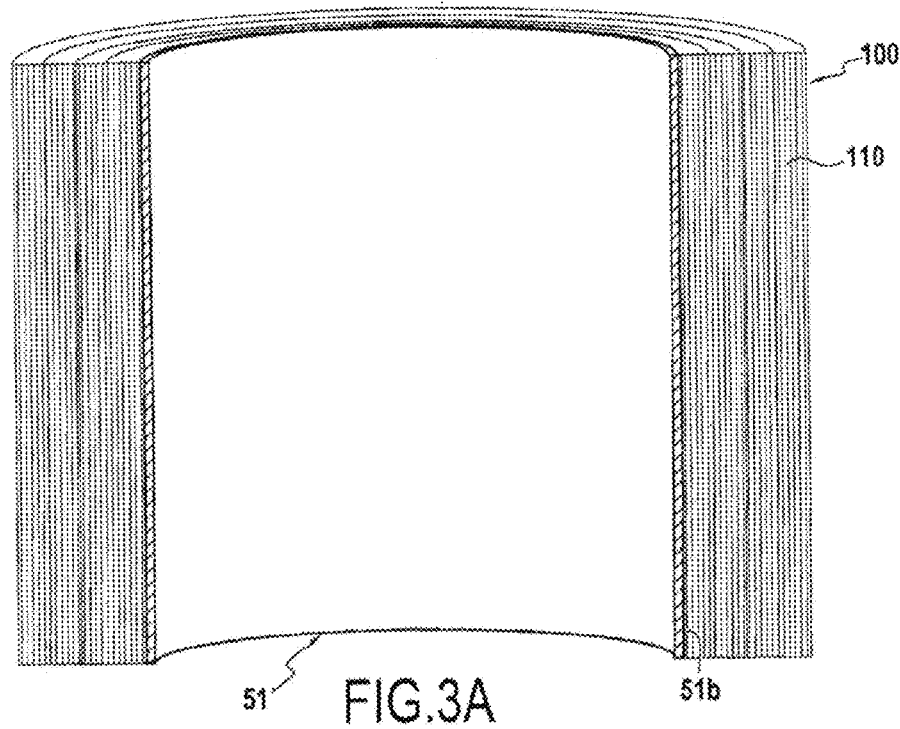
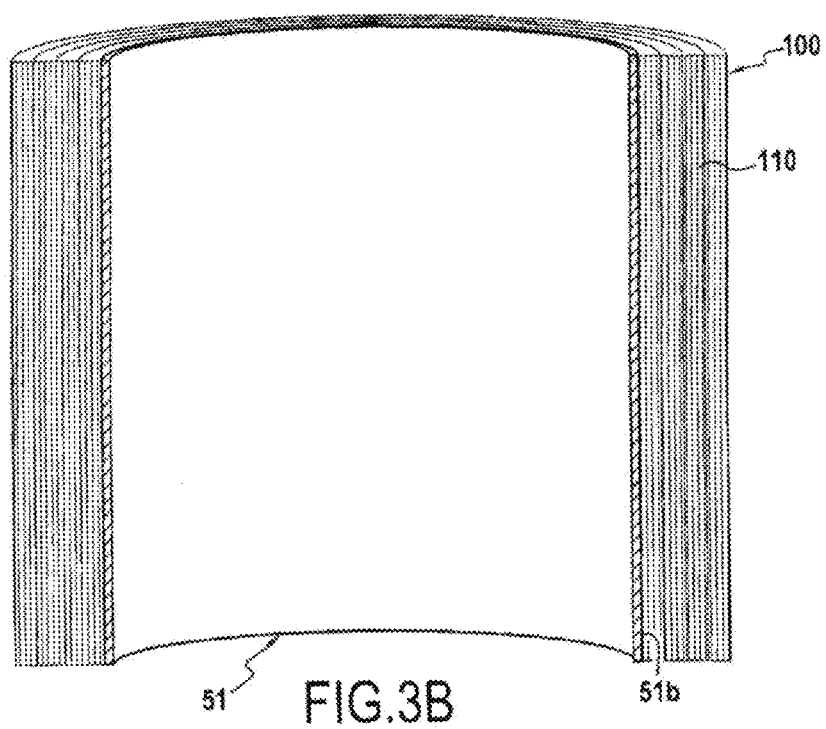

COMPOSITE MATERIAL PART HAVING THERMAL PROTECTION BASED ON RESIN, AND ITS METHOD OF FABRICATION

BACKGROUND OF THE INVENTION

The present invention relates to providing thermal protection for composite material parts having an organic matrix.

The field of application of the invention relates more particularly, but not exclusively, to organic matrix composite material parts used in aeroengines such as turboprops.

In aeroengines, most of the parts have until recently been made of metal materials. In order to reduce the weight of such parts, many of them, and in particular those constituting the covering of the engine such as the casing or covers and also the elements supporting those parts, or indeed parts forming portions of the fan assembly of the engine, are nowadays made out of composite material, i.e. the parts are made up of fiber reinforcement densified with an organic matrix, such as a thermosetting or thermoplastic resin, for example.

Nevertheless, exposed surface(s) of such parts may be subjected to temperatures that are higher than those that are acceptable for the composite material from which they are made.

Several solutions are presently used for providing organic matrix composite material parts with thermal protection. Nevertheless, all of those known solutions make use of additional parts or coatings such as thermal blankets or metal screens, thereby giving rise to extra costs in the fabrication of the part. In addition, fastening that type of thermal protection on a composite material part is not easy and requires the use of specific fastener means such as inserts, bolts, or Velcro, for example. Finally, adding thermal protection parts significantly increases the overall weight of the part.

There therefore exists a need to have thermal protection on organic matrix composite material parts and to do without significantly increasing the cost or the overall weight of the part and while enabling the thermal protection to be fastened thereon easily and reliably.

OBJECT AND SUMMARY OF THE INVENTION

To this end, the invention proposes a method of making a structural part having a thermal protection barrier, the method comprising at least the following steps:
  making a fiber structure;
  introducing the fiber structure into an injection mold having first and second chambers, the fiber structure being placed in the second chamber;
  placing a movable separator partition between the first and second chambers;
  injecting a first resin into the first chamber;
  solidifying the resin injected into the first chamber;
  withdrawing the movable separator partition;
  injecting a second resin into the second chamber containing the fiber texture; and
  hardening the resins present in the first and second chambers of the injection mold in such a manner as to obtain a part having a structural core made of composite material constituted by fiber reinforcement densified by an organic matrix, and a thermal barrier constituted by a layer of hardened resin.

The layer of hardened resin that is formed in this way contains no or practically no fibers of the fiber structure. This obtains a surface layer that presents a thermal diffusion coefficient that is much less than that of the underlying composite material since the fibers of the fiber structure presents a thermal diffusion coefficient that is much higher than that of the resin. Consequently, the surface portions of the structural core made of composite material that needs to be protected from heat fluxes are covered in a layer of hardened resin that is a poor conductor of heat and that acts as a thermal protection barrier.

In addition, the thermal protection barrier made by the method of the invention does not require unrelated parts to be fitted onto the structural core, but on the contrary is fully integrated in the method of fabricating the structural core. Furthermore, in terms of the overall weight of the part, the thermal protection barrier based on resin is much less penalizing than is adding metal parts as in the prior art.

In a first aspect of the method of the invention, the first and second resins are selected from at least: a thermosetting resin and a thermoplastic resin.

In a second aspect of the method of the invention, the first and second resins are identical.

In a third aspect of the method of the invention, the first and second resins are different. Under such circumstances, the first resin preferably presents a glass transition or melting temperature higher than the glass transition or melting temperature of the second resin. In addition, the first resin preferably presents a glass transition temperature higher than a determined temperature corresponding to the maximum utilization temperature of the structural part.

BRIEF DESCRIPTION OF THE DRAWINGS

Other characteristics and advantages of the invention appear from the following description of particular implementations of the invention given as non-limiting examples and with reference to the accompanying drawings, in which:

FIGS. 3A to 3H are section views showing the FIG. 1 fan casing being made in accordance with an implementation of the method of the invention.

DETAILED DESCRIPTION OF IMPLEMENTATIONS

The invention applies in general to making composite material parts comprising fiber reinforcement densified by an organic matrix, said part also including a thermal protection barrier over all or at least a portion of one of its exposed surfaces.

Figure 1:
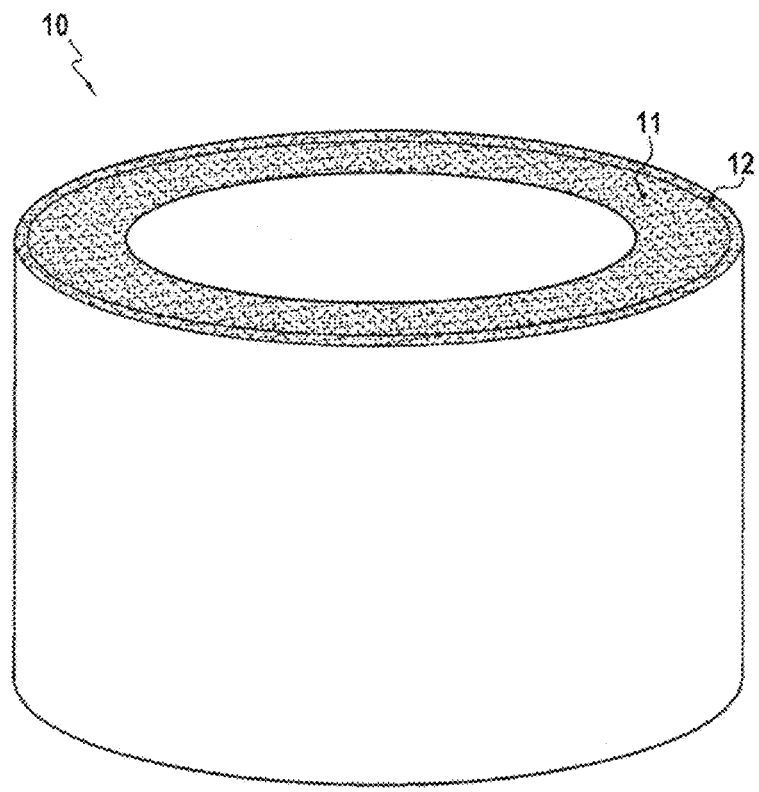
FIG. 1 is a diagrammatic perspective view of a fan casing provided with a thermal protection barrier in accordance with an implementation of the invention.

FIG. 1 shows a fan casing 10 for an aeroengine, the casing being made of composite material comprising a structural core 11 in the form of a shroud made of composite material comprising fiber reinforcement densified by an organic matrix. In accordance with the invention, the structural core 11 is provided on its outside surface with a thermal protection barrier 12.

Figure 2A:
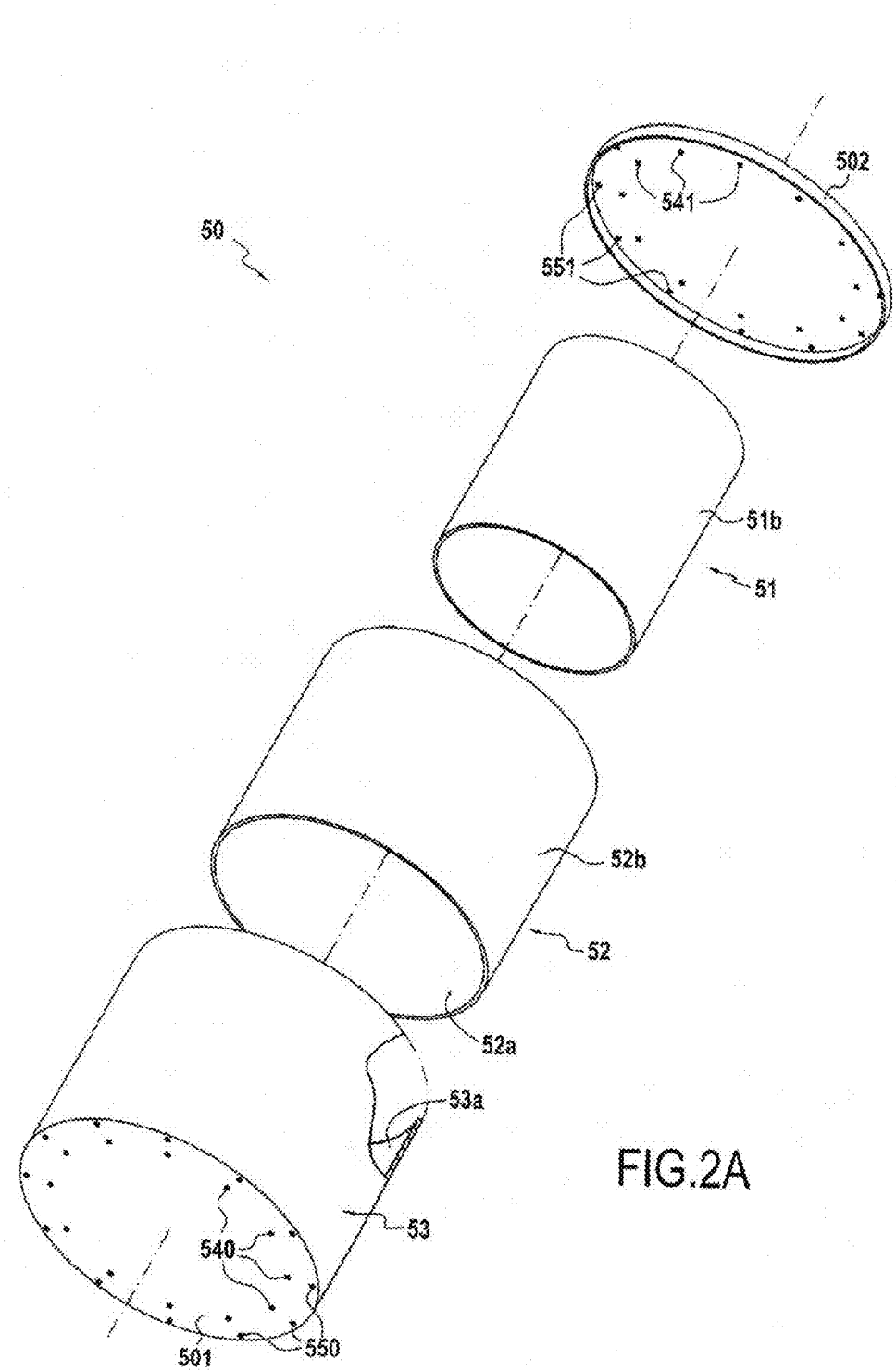
FIG. 2A is an exploded perspective view of an injection mold in accordance with an implementation of the invention.
Figure 2B:
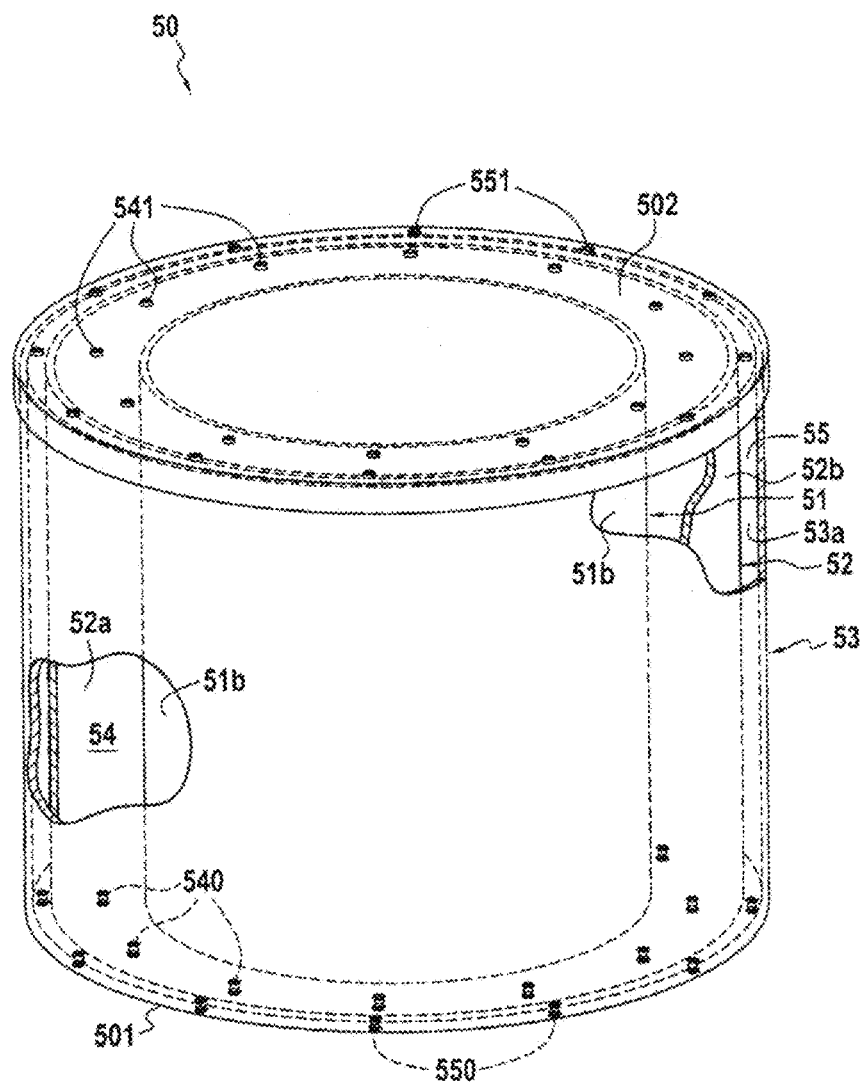
FIG. 2B is a diagrammatic view of the FIG. 2A mold once assembled.

For this purpose, and as shown in FIGS. 2A and 2B, an injection mold 50 is used that comprises a mandrel 51, a movable partition 52, and a stationary wall 53 arranged coaxially relative to one another. The stationary wall 53 is fastened to the end wall 501 of the mold 50, which mold also includes a cover 502 enabling the mold 50 to be closed.

The space defined between the outside surface 52b of the movable partition 52 and the inside surface 53a of the stationary wall 53 forms a first injection chamber 55 into which the resin that is to form the thermal protection barrier is injected. The space defined between the outside surface 51b of the mandrel 51 and the inside surface 52a of the movable partition 52 forms a second injection chamber 54 into which a fiber texture that is to form the fiber reinforcement of the structural core of the casing is placed in order to be densified by injecting a resin and then hardening the resin.

The mold 50 also has injection ducts 540 and 550 in its end wall 501 serving respectively to inject resin into the injection chambers 54 and 55. The mold 50 also has suction ducts 541 and 551 in its cover 502 serving to set up pressure gradients inside the chambers 54 and 55 and enhance the injection of resin throughout the volumes of the chambers. The mold 50 also has heating and/or cooling means connected to a control device (not shown in FIG. 2A) in order to control the solidification and the hardening of the resins injected into the chambers 54 and 55.

The chambers 54 and 55 may be put into communication by withdrawing the movable partition 52 as described below.

Fabrication of the casing 10 begins by making a fiber structure that is to form the fiber reinforcement of the structural core (step S1, and FIG. 3A).

In the example described and as shown in FIG. 3A, a fiber structure 100 is shaped on the mandrel 51 forming part of an injection mold 50 by stacking fiber plies 110 that may be in the form of a woven fabric, a braid, a knit, a felt, sheets, etc. The plies may also be bonded together, e.g. by stitching, by implanting yarns or rigid elements, or by needling.

The fiber structure may also be obtained by multilayer weaving performed in known manner on a Jacquard type loom having a bundle of warp yarns or strands in a plurality of layers, the warp yarns being interlinked by weft yarns. The multilayer weaving may in particular be performed using an "interlock" weave, i.e. a weave in which each layer of weft yarns interlinks a plurality of layers of warp yarns, with all of the yarns of a given weft column having the same movement in the weave plane. Other types of known multilayer weaving may be used, in particular such as those described in document WO 2006/136755, the content of which is incorporated herein by way of reference.

The fibers constituting the fiber structure are, in particular, refractory fibers, i.e. fibers made of ceramic, e.g. of silicon carbide (SiC), carbon fibers, or even fibers made of a refractory oxide, e.g. of alumina ($Al_2O_3$). In the presently-described implementation, the fiber structure 100 is made from fiber plies 110 made of carbon fiber.

Once terminated, the fiber structure 100 is compacted in order to adjust the size of the second injection chamber 54 and increase the fiber density in the structure (step S2, and FIG. 3B). The compacting also makes it possible to prevent the fibers from extending into the zone that is reserved for forming the thermal protection barrier.

Figure 3C:
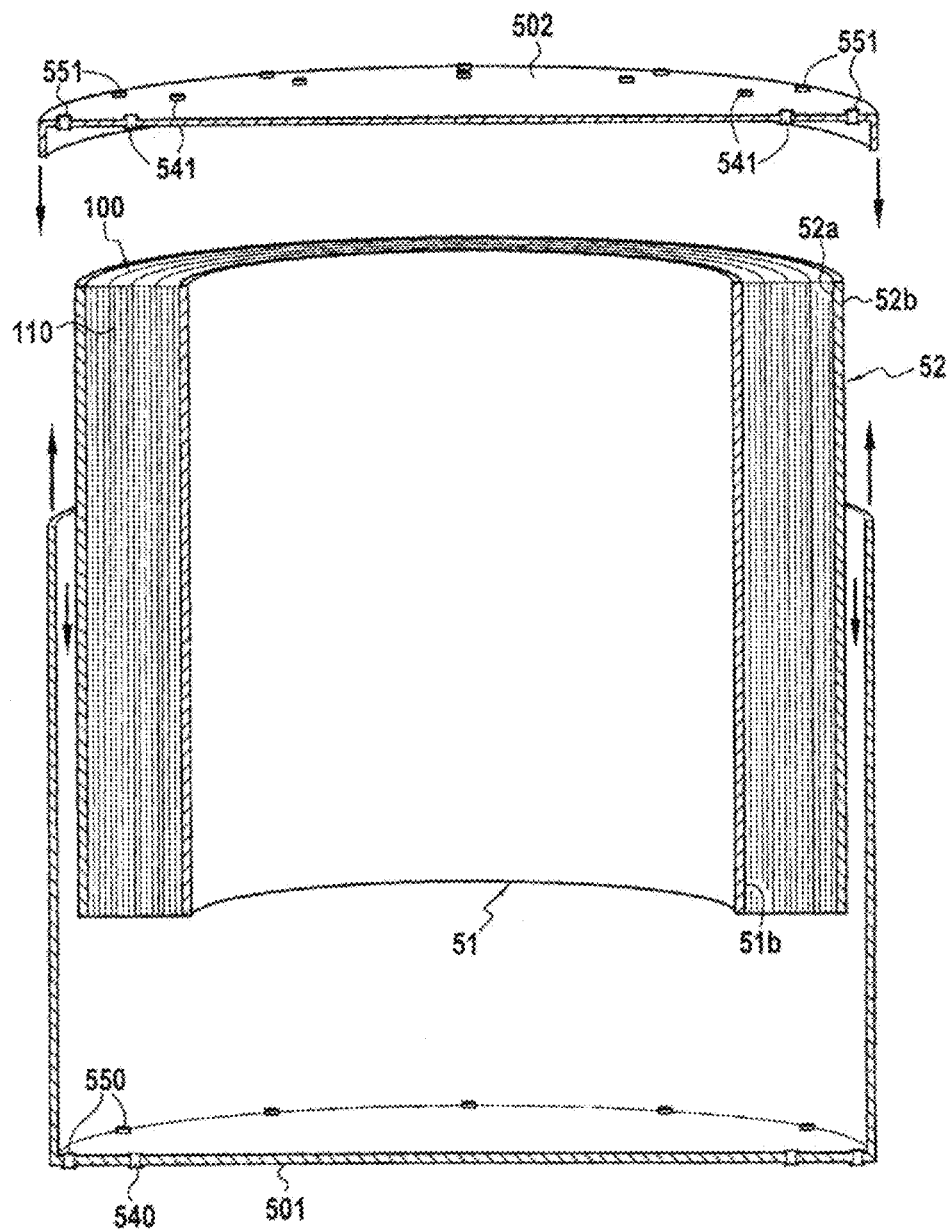

The movable partition 52 is then put into place on the mandrel 51 around the compacted fiber structure 100 and the assembly is inserted into the stationary wall 53 and the cover 502, the mold 50 then being closed once more with the cover 502 (step S3, and FIG. 3C).

Figure 3D:
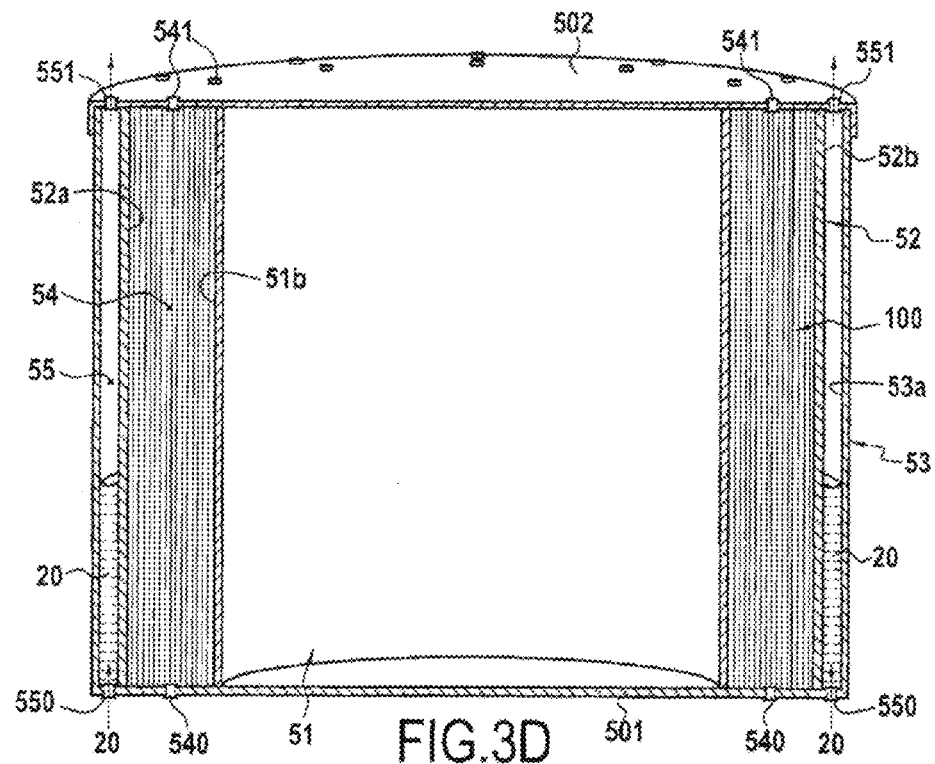
Figure 3E:
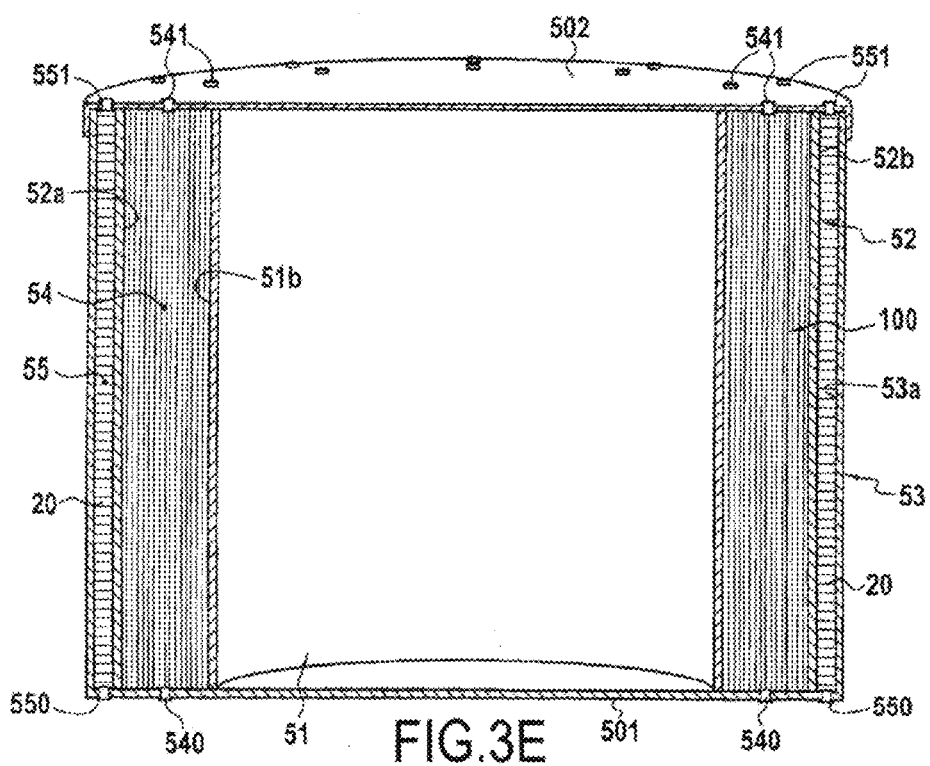
Figure 3F:
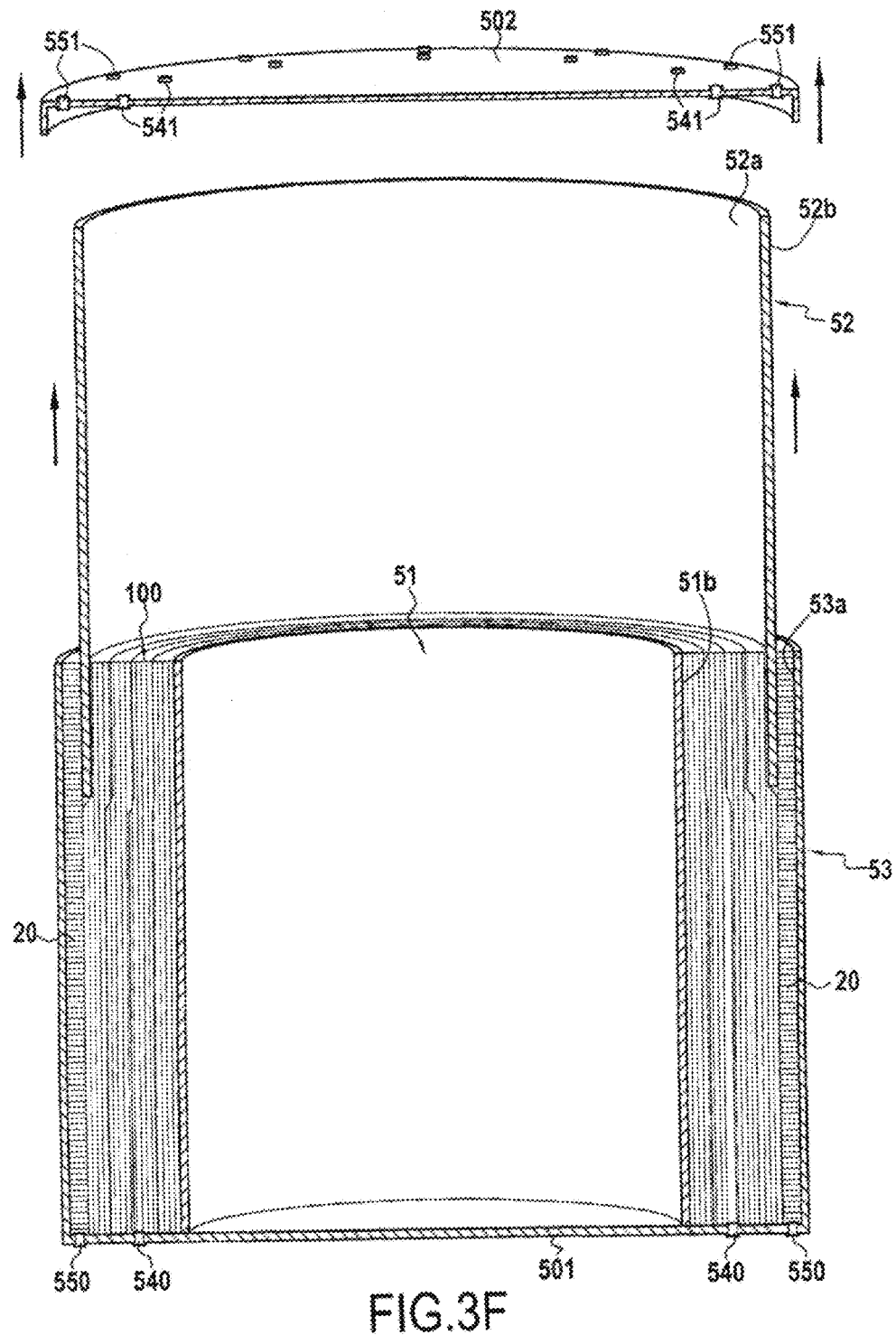

In accordance with the method of the invention, a first resin 20 is then injected into the first chamber 55 via the injection ducts 550, with no resin being injected for the time being into the chamber 54 (step S4, and FIG. 3D). Once the chamber 55 has been filled with the resin 20, the resin 20 is solidified (step S5, and FIG. 3E). With a thermosetting resin, solidification is performed by controlling the heater means of the mold 50 in order to subject the resin to a first polymerization cycle (pre-polymerization) that is sufficient to gel the resin 20. With a thermoplastic resin, solidification is obtained by reducing the temperature of the first chamber until vitrification for amorphous thermoplastic resins or until crystallization for semi-crystalline thermoplastic resins. Once the resin 20 has solidified, the cover 502 is removed and the movable partition 52 is withdrawn so as to unite the injection chambers 54 and 55 (step S6, and FIG. 3F), the cover 502 then being put back into place after the movable partition has been removed.

Figure 3G:
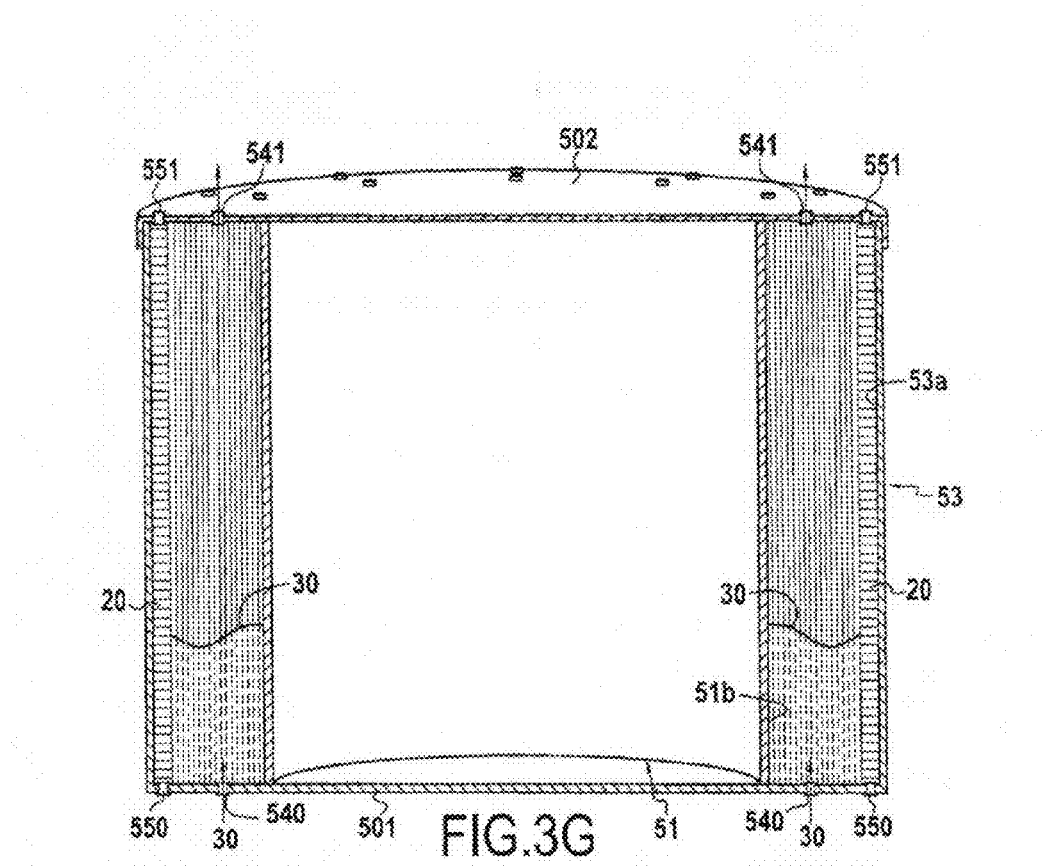

A second resin 30 is then injected into the second chamber 54 containing the fiber texture 100 via the injection ducts 540 (step S7, and FIG. 3G). The resin 30 injected into the bottom portion of the mold 50 progressively impregnates the entire fiber texture by flowing in the second chamber 54 up to the discharge ducts 551 through which the surface resin is discharged (not shown in FIG. 3G).

Figure 3H:
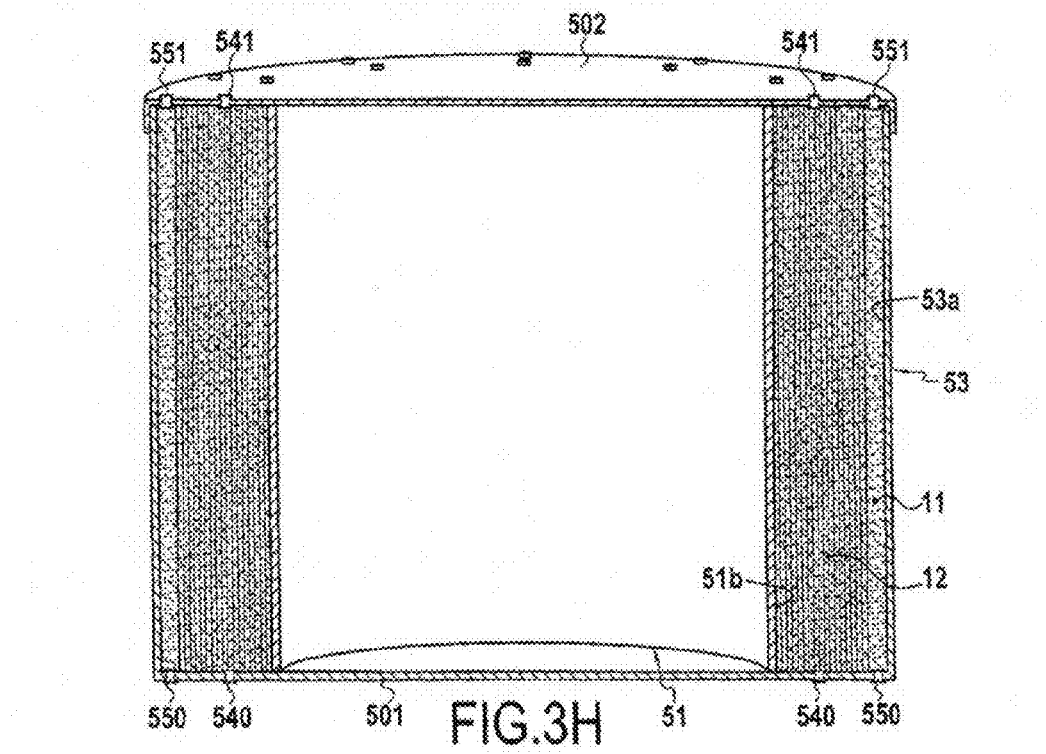
Figure 4:
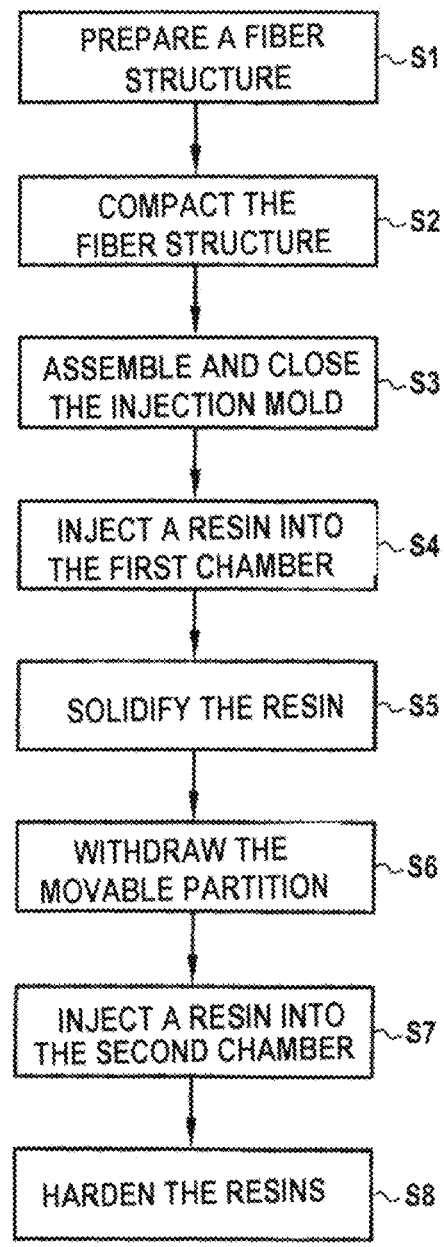
FIG. 4 is a flow chart of the steps implemented in FIGS. 3A to 3H.

Once the fiber texture 100 has been totally impregnated, then the resin 30, and possibly also the solidified resin 20, is/are subjected to treatment enabling the resins 20 and 30 to be hardened completely (step S8, and FIG. 3H).

As shown in FIG. 1, this produces a casing 10 having a central core 11 of composite material comprising fiber reinforcement densified by an organic matrix, and provided on its outside surface with a thermal protection barrier 12 formed by a hardened layer of pure resin.

The resins 20 and 30 used respectively for forming the thermal protection barrier and the matrix of the composite material of the casing may in particular be thermoplastic or thermosetting resins such as the high-performance epoxy resin sold under the reference PR 520 by the supplier Cytec.

When using a thermosetting resin for forming both the thermal protection barrier and the matrix of the composite material, the first resin is injected into the first chamber which is then heated to a temperature serving to initiate polymerization of the resin, with this continuing for a duration that enables the resin to gel. The first thermosetting resin is considered as being gelled when its degree of polymerization has reached about 66% or when the viscous nature of the resin is less than its rheological elastic nature, or indeed when it is no longer possible to dissolve the resin on immersing it in a solvent. The gelled resin then forms a three-dimensional array of chemical bonds. Once the second thermosetting resin has been injected into the second chamber, the heater means of the mold are operated in order to initiate a cross-linking cycle serving to harden (co-cure) the gelled first resin and the injected second resin and consequently serving to form the matrix of the composite material of the structural core of the casing together with the thermal protection barrier of the casing. During this cross-linking cycle, covalent bonds are created at the interface between the first and second resins forming a uniform array of cross-linking points making this interface mechanically strong.

When using a thermoplastic resin to form both the thermal protection barrier and the matrix of the composite material, the first resin is injected into the first chamber, which is then cooled to a temperature for a duration sufficient to enable it to vitrify, if it is an amorphous thermoplastic resin, or to crystallize, if it is a semi-crystalline thermoplastic resin.

Likewise, once the second thermoplastic resin has been injected into the second chamber, the second chamber is then cooled to a temperature and for a duration making it possible to obtain vitrification of the resin, if it is an amorphous thermoplastic resin, or crystallization thereof, if it is a semi-crystalline thermoplastic resin, so as to form the matrix of the composite material of the structural core of the casing together with the thermal protection barrier of the casing. When using two thermoplastic resins having different vitrification or crystalline characteristics, it is preferable to select as the second resin, i.e. the resin that is injected into the second chamber, a resin that has a glass transition temperature or a crystallization temperature that is less than or equal to that of the first resin previously injected into the first chamber, in order to avoid or limit creep of the first resin during injection of the second resin. When using a thermoplastic resin to form the thermal protection barrier and using a thermosetting resin to form the matrix of the composite material, the thermosetting resin must be capable of being processed at a polymerization temperature lower than the glass transition temperature of the thermoplastic resin, if it is an amorphous resin, or its crystallization temperature, if it is a semi-crystalline resin. After the first thermoplastic resin has been injected into the first chamber and vitrified or crystallized, the thermosetting second resin is injected into the second chamber, and under such circumstances it is polymerized at a temperature that serves to avoid or limit creep of the thermoplastic first resin.

Likewise, when using a thermosetting resin to form the thermal barrier and a thermoplastic resin to form the matrix of the composite material, the thermosetting resin must also be capable of being processed at a polymerization temperature lower than the glass transition temperature of the thermoplastic resin, if it is amorphous, or its crystallization temperature, if it is semi-crystalline. In this situation, the hardening of the gelled thermosetting first resin (i.e. complete polymerization thereof), as performed after injecting and vitrifying or crystallizing the thermoplastic second resin into the second chamber needs to be performed at a temperature that serves to avoid or limit creep of the thermoplastic second resin.

For the thermal protection barrier, it is possible in general manner to use any resin that presents thermal diffusion coefficients that are less than those of the fibers used for forming the reinforcement of the composite material. For example, epoxy resins present a thermal diffusion coefficient of about 0.25 watts per minute per kelvin (W/m/K), whereas carbon fibers present a thermal diffusion coefficient lying in the range 7 W/m/K to 50 W/m/K.

For reasons of chemical compatibility, it is preferable to use the same resin to form the thermal protection barrier and the matrix of the composite material.

Nevertheless, as mentioned above, it is possible to use different resins to form the thermal protection barrier and the matrix of the composite material, and in particular it is possible to use two thermosetting resins or two thermoplastic resins having different glass transition or melting temperatures, or indeed a thermosetting resin and a thermoplastic resin respectively for forming the thermal protection barrier and the matrix of the composite material, or vice versa. Under such circumstances, it is preferable for the thermal protection barrier to be formed using a resin that presents a glass transition or melting temperature (for a semi-crystalline thermoplastic resin) that is higher than the intended maximum utilization temperature of the part, while the resin that forms the matrix of the composite material may then have a glass transition or melting temperature that is lower than the maximum utilization temperature. Nevertheless, the resin forming the thermal protection barrier may also present a glass transition or melting temperature that is lower than or equal to the maximum intended utilization temperature for the part providing its creep remains limited at the maximum utilization temperature so as to preserve the integrity of the thermal protection, at least in part. Under such circumstances, the resin forming the matrix of the composite material may have a glass transition or melting temperature that is lower than the maximum utilization temperature, or indeed lower than the glass transition or melting temperature of the resin forming the thermal protection barrier.

The thermal protection barrier of the invention may be formed over only a fraction of the surface of the structural core. Under such circumstances, the chamber that is to receive the resin forming the thermal protection barrier is formed only over the fraction of the surface of the structural core that is to be provided with the thermal protection barrier. The dimensions of the movable partition of the injection mold are also adapted as a function of the zone on which the thermal protection barrier is to be formed.

Furthermore, the present invention is not limited to making a part in the form of a shroud such as the above-described casing 10. It may be implemented for fabricating parts of different shapes. The person skilled in the art will have no difficulty in adapting the shape of the injection mold to the shape intended for the part.

What is claimed is:

1. A method of making a structural part having a thermal protection barrier, the method comprising at least the following steps:
    making a fiber structure;
    introducing the fiber structure into an injection mold having first and second chambers, the fiber structure being placed in the second chamber;
    placing a movable separator partition between the first and second chambers;
    injecting a first resin into the first chamber;
    solidifying the resin injected into the first chamber;
    withdrawing the movable separator partition;
    injecting a second resin into the second chamber containing the fiber structure; and
    hardening the resins present in the first and second chambers of the injection mold in such a manner as to obtain the structural part having a structural core made of composite material constituted by fiber reinforcement densified by an organic matrix, and a thermal barrier constituted by a layer of hardened resin,
    wherein the injection mold includes a mandrel, the movable separator, and a stationary wall arranged coaxially, the first chamber being defined between an outside surface of the movable separator and an inside surface of the stationary wall, and the second chamber being defined between an outside surface of the mandrel and an inside surface of the movable separator such that the first chamber and second chamber are coaxial and the first chamber surrounds the second chamber.

2. A method according to claim 1, wherein the first resin is a thermosetting resin or a thermoplastic resin, and the second resin is a thermosetting resin or a thermoplastic resin.

3. A method according to claim 2, wherein the first and second resins are identical.

4. A method according to claim 2, wherein the first and second resins are different.

5. A method according to claim 4, wherein the first resin presents a glass transition or melting temperature higher than a glass transition or melting temperature of the second resin.

6. A method according to claim 5, wherein the glass transition temperature of the first resin is higher than a determined temperature corresponding to a maximum utilization temperature of the structural part.

7. A method of making a structural part having a thermal protection barrier, the method comprising at least the following steps:
    making a fiber structure;
    introducing the fiber structure into an injection mold having first and second chambers, the fiber structure being placed in the second chamber;
    placing a movable separator partition between the first and second chambers;
    injecting a first resin into the first chamber;
    solidifying the resin injected into the first chamber;
    withdrawing the movable separator partition;
    injecting a second resin into the second chamber containing the fiber structure; and
    hardening the resins present in the first and second chambers of the injection mold in such a manner as to obtain the structural part having a structural core made of composite material constituted by fiber reinforcement densified by an organic matrix, and a thermal barrier constituted by a layer of hardened resin,
    wherein the injection mold includes a mandrel, the movable separator, and a stationary wall arranged coaxially, the first chamber being defined between an outside surface of the movable separator and an inside surface of the stationary wall, and the second chamber being defined between an outside surface of the mandrel and an inside surface of the movable separator such that the first chamber and second chamber are coaxial and the first chamber surrounds the second chamber, and
    wherein the fiber structure is placed on the mandrel.

8. A method of making a structural part having a thermal protection barrier, the method comprising at least the following steps:
    making a fiber structure;
    introducing the fiber structure into an injection mold having first and second chambers, the fiber structure being placed in the second chamber;
    placing a movable separator partition between the first and second chambers;
    injecting a first resin into the first chamber,
    solidifying the resin injected into the first chamber;
    withdrawing the movable separator partition;
    injecting a second resin into the second chamber containing the fiber structure; and
    hardening the resins present in the first and second chambers of the injection mold in such a manner as to obtain the structural part having a structural core made of composite material constituted by fiber reinforcement densified by an organic matrix, and a thermal barrier constituted by a layer of hardened resin,
    wherein the injection mold includes a mandrel, the movable separator, and a stationary wall arranged coaxially, the first chamber being defined between an outside surface of the movable separator and an inside surface of the stationary wall, and the second chamber being defined between an outside surface of the mandrel and an inside surface of the movable separator such that the first chamber and second chamber are coaxial and the first chamber surrounds the second chamber, and
    wherein the mandrel, the movable separator, the stationary wall, and the structural part are each cylindrical in shape.

* * * * *